(12) United States Patent
Dwarakanath et al.

(10) Patent No.: US 7,770,641 B2
(45) Date of Patent: Aug. 10, 2010

(54) METHOD FOR ENHANCING OIL RECOVERY WITH AN IMPROVED OIL RECOVERY SURFACTANT

(75) Inventors: Varadarajan Dwarakanath, Houston, TX (US); Curtis Bay Campbell, Hercules, CA (US); Tanmay Chaturvedi, Houston, TX (US); Theresa Ann Denslow, Concord, CA (US); Adam Jackson, League City, TX (US); Taimur Malik, Houston, TX (US); Gabriel Prukop, Katy, TX (US); Sophany Thach, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 11/959,151

(22) Filed: Dec. 18, 2007

(65) Prior Publication Data

US 2009/0151941 A1    Jun. 18, 2009

(51) Int. Cl.
 *E21B 43/22* (2006.01)
 *E21B 43/16* (2006.01)
(52) U.S. Cl. .............. 166/270.1; 166/400; 166/305.1; 166/300
(58) Field of Classification Search ............... None
See application file for complete search history.

(56) References Cited

U.S. PATENT DOCUMENTS

| 3,236,303 | A | * | 2/1966 | Csaszar | 166/270.2 |
| 3,302,713 | A | * | 2/1967 | Ahearn et al. | 166/270.1 |
| 3,507,331 | A | * | 4/1970 | Jones | 166/400 |
| 3,637,017 | A | * | 1/1972 | Gale et al. | 166/270.1 |
| 3,990,515 | A | * | 11/1976 | Wilchester et al. | 166/270.1 |
| 4,195,777 | A |   | 4/1980 | Kalfoglou |   |
| 4,271,907 | A |   | 6/1981 | Gale |   |
| 4,337,159 | A | * | 6/1982 | Reed et al. | 507/211 |

(Continued)

FOREIGN PATENT DOCUMENTS

EP    0 212 671    3/1980

OTHER PUBLICATIONS

Levitt. et al., "Identification and Evaluation of High-Performance EOR Surfactants," SPE/DOE Symposium on Improved Oil Recovery, Apr. 2006.

(Continued)

*Primary Examiner*—Zakiya W Bates
*Assistant Examiner*—Angela M DiTrani
(74) *Attorney, Agent, or Firm*—Christopher D. Northcutt

(57) ABSTRACT

A method for enhancing oil recovery includes the step of providing a subsurface reservoir containing hydrocarbons therewithin. A wellbore is provided in fluid communication with the subsurface reservoir. A surfactant-polymer solution is formed for injection into the reservoir. The surfactant-polymer solution is formed by mixing a composition with at least one surfactant, at least one polymer, and at least one co-solvent or co-surfactant such that the surfactant-polymer solution is clear and aqueous stable. The surfactant-polymer solution is injected through the wellbore into the reservoir. A chaser solution is formed for injection into the reservoir. The chaser solution has an additional predetermined quantity of the co-solvent or co-surfactant. The chaser solution is injected through the injection wellbore into the reservoir to increase the production of hydrocarbons from the reservoir while maintaining the clear and aqueous stability of the surfactant-polymer solution.

27 Claims, 4 Drawing Sheets

U.S. PATENT DOCUMENTS

| | | | |
|---|---|---|---|
| 4,360,061 A * | 11/1982 | Canter et al. | 166/270.1 |
| 4,458,760 A | 7/1984 | Hurd | |
| 5,167,281 A | 12/1992 | Kalfoglou | |
| 6,022,843 A | 2/2000 | Shanks et al. | |
| 7,183,452 B2 | 2/2007 | Campbell et al. | |
| 2005/0199395 A1 | 9/2005 | Berger et al. | |
| 2006/0014650 A1 * | 1/2006 | Campbell et al. | 507/259 |
| 2006/0058199 A1 | 3/2006 | Berger et al. | |

OTHER PUBLICATIONS

Jayanti, et al. "Laboratory Evaluation of Custom-Designed Surfactants To Remediate NAPL Source Zones," Environmental Science & Technology, vol. 36, pp. 5491-5497 (2002).

Dwarakanath, et al., "Surfactant Phase Behavior with Field Degreasing Solvent," Environmental Science & Technology, vol. 34, pp. 4842-4848 (2000).

* cited by examiner

METHOD FOR ENHANCING OIL RECOVERY WITH AN IMPROVED OIL RECOVERY SURFACTANT

TECHNICAL FIELD

The present invention is directed to the recovery of oil from subterranean petroleum reservoirs, and more particularly, to an enhanced oil recovery surfactant-polymer solution and a method of making and using the same.

BACKGROUND OF THE INVENTION

Crude oil production from oil in subterranean reservoirs may involve use of various flooding methods as the natural forces, which are used in the "primary recovery" process, become depleted. A large portion of the crude oil may have to be driven out of the formation in "secondary" or "tertiary" recovery processes. In addition, some reservoirs may not have sufficient natural forces for oil production even by primary recovery processes. The production of crude oil using such flooding methods is one example of enhanced oil recovery process.

Currently, the petroleum industry is re-evaluating technologies that will improve the ability to recover remaining and untapped oil from the subterranean reservoirs. Injecting a displacing fluid or gas may begin early, long before the complete depletion of the field by primary recovery processes. Methods for improving displacement efficiency or sweep efficiency may be used at the very beginning of the first injection of a displacing fluid or gas, rather than under secondary and tertiary recovery conditions.

The easiest method of flooding a subterranean reservoir for the production of crude oil is by injecting a liquid or a gas into the well to force the oil to the surface. Water flooding is the most widely used fluid. However, water does not readily displace oil because of the high interfacial tension between the two liquids which result in high capillary pressure that trap in porous media.

The addition of chemicals to modify the properties of the flooding liquid is well known in the art of improved/enhanced oil recovery. Surfactants are one class of chemical compounds that have been used in aqueous media for enhanced oil recovery. Surfactants have been found to effectively lower the interfacial tension between oil and water and enable mobilization of trapped oil through the reservoir.

Alkylaryl sulfonates have been used as surfactants for enhanced oil recovery. They have been used in surfactant flooding, alone, or in conjunction with co surfactants and/or sacrificial agents. Alkylaryl sulfonates are generally used not only because they are able to lower the interfacial tension between oil and water, but also because when used in conjunction with varying amounts of other salts, such as, sodium chloride they exhibit desirable phase behavior. Depending on the molecular weight and molecular weight distribution, branching and point of attachment of the aryl group to the alkyl groups, alkylaryl sulfonates can be tailored to preferentially reside in the aqueous or oleic phases at different electrolyte concentrations, i.e., salinities. At low salinities the alkylaryl sulfonates reside in water and at high salinities they partition into the oil. In either case, the swollen micellar solutions that contain surfactants, oil and water are termed microemulsions. At optimal salinity an equal volume of oil and water are solubilized in the microemulsion. For well tailored and matched alkylaryl sulfonates, the high volumes of oil and water solubilized in the microemulsion result in ultra-low interfacial tensions that provide potential for high oil recovery from reservoirs.

The salinity of the water in subterranean hydrocarbon reservoirs may vary a great deal, for example, the Minas oil field in Indonesia has total dissolved salts of between 0.2 and 0.3 weight percent. Other reservoirs may have salinities as high as or higher than 2.0 percent sodium chloride and over 0.5 percent calcium chloride and magnesium chloride. It is desirable to optimize the alkylaryl sulfonates for surfactant flooding for enhanced oil recovery for a particular reservoir by evaluating tailored versions of the alkylaryl sulfonates with native reservoir brine and reservoir oil under ambient reservoir conditions via phase behavior experiments. In addition to the phase behavior experiments a few interfacial tension measurements are needed to verify that the interfacial tensions are acceptably low. In addition to testing the surfactants with native reservoir brines additional tests with injected solutions are needed as in some instances the injectate brine is different from native reservoir brines.

Generally, pure alkylaryl sulfonates, that is, those having a narrow range of molecular weights, are useful for recovery of light crude oils. Such alkylaryl sulfonates have exhibited poor phase behavior, i.e., poor potential to recover oils, containing high wax content. Oils with typically high wax content generally have high equivalent average carbon numbers (EACN's). The equivalent alkane carbon number (EACN) is a representation of an average carbon chain length of a hydrocarbon mixture. As an illustration, pentane, hexane and heptane have alkane carbon numbers of 5, 6 and 7 respectively. However a mixture containing 1 mole of pentane and one mole of hexane would have an EACN of 5.5. Field crude oils are complex mixtures but when interacting with surfactants, they behave as a single component fluid with an EACN that is a mole fraction average of its constituents.

Alkylaryl sulfonates having a broad spectrum of carbon chain lengths in the alkyl group are more desirable for use to recover waxy crude oils or crude oils with high equivalent average carbon numbers (EACN's). In addition to optimizing the molecular weight and/or molecular weight distribution of an alkylaryl sulfonate to maximize the amount of oil in the aforementioned micro-emulsion, the use of other components in combination with the alkylarylsulfonate, such as inorganic salts, co-solvents, polymeric materials and co-surfactants may improve phase behavior. The performance of an enhanced oil recovery formulation may also be measured by the oil solubilization parameter, which the volume of oil dissolved per unit volume of surfactant. The oil solubilization is inversely proportional to the interfacial tensions. In addition the performance is also measure by the ability of the formulation to achieve stable microemulsions and low interfacial tensions rapidly, i.e., in less than one day in the laboratory.

A number of patents and patent applications have discussed methods for enhanced oil recovery using surfactant flooding. In addition to the use of surfactants, there are a number of patent and patent applications discussing the use of co-surfactants and sacrificial agents for enhanced oil recovery.

Hsu et al., U.S. Pat. No. 6,022,843 discloses an improved concentrated surfactant formulation and process for the recovery of residual oil from subterranean petroleum reservoirs, and more particularly an improved alkali surfactant flooding process which results in ultra-low interfacial tensions between the injected material and the residual oil, wherein the concentrated surfactant formulation is supplied at a concentration above, at, or below its critical micelle concentration, also providing in situ formation of surface active material formed from the reaction of naturally occurring organic acidic components with the injected alkali material which serves to increase the efficiency of oil recovery.

Berger et al., U.S. Published Patent Application No. 2005/0199395A1 discloses an oil recovery process and a particular class of alkylaryl sulfonate surfactants. The surfactants are derived from an alpha-olefin stream having a broad distribution of even carbon number ranging from 12 to 28 or more.

A general treatise on enhanced oil recovery is Basic Concepts in Enhanced Oil Recovery Processes edited by M. Baviere (published for SCI by Elsevier Applied Science, London and New York, 1991).

Prior surfactant-polymer solutions used for enhanced oil recovery were historically hazy and/or translucent. The solutions were hazy because of large micellar size. The surfactants are most effective when they have a balanced solubility in oil and water. In most cases the surfactant and its micelles are only sparingly soluble in the aqueous phase; and therefore, they exist more as a dispersion of relatively large micelles. The size of these micelles approaches the wavelengths of light and thus, interferes with the passage of light and makes the solutions hazy or opaque.

When surfactant flooding is applied for oil recovery, the surfactant/polymer formulations may need to propagate for distances on the order of 100-600 ft. Over such distances these hazy solutions tend to phase separate and also get filtered out by the porous medium.

In the past minimal attention has been paid to aqueous stability. During the London floods, another operator achieved aqueous stability of the surfactant-polymer formulation, but did not consider the interactions with the chase solutions. Similarly, during the surfactant field trial in Minas in 2002, there was not an importance placed upon aqueous stability, which was a contributing factor to lower than anticipated oil recovery.

SUMMARY OF THE INVENTION

A method for enhancing oil recovery includes the step of providing a subsurface reservoir containing hydrocarbons therewithin. A wellbore is provided in fluid communication with the subsurface reservoir. A surfactant-polymer solution is formed for injection into the reservoir. The surfactant-polymer solution is formed by mixing a composition with at least one surfactant, at least one polymer, and at least one co-solvent or co-surfactant such that the surfactant-polymer solution is clear and aqueous stable. A chaser solution is formed for injection into the reservoir. The chaser solution has an additional predetermined quantity of the co-solvent or co-surfactant. The chaser solution is injected through the injection wellbore into the reservoir to increase the production of hydrocarbons from the reservoir while maintaining the clear and aqueous stability of the surfactant-polymer solution.

In the method, the wellbore can be an injection wellbore associated with an injection well, and the method can also include the step of providing a production well spaced-apart from the injection well a predetermined distance. The production wellbore can have a production wellbore in fluid communication with the subsurface reservoir. The injection of the surfactant-polymer solution and the chaser solution increases the flow of the hydrocarbons to the production wellbore.

In the method, the polymer can be selected from a group consisting of polysaccharide, a polyacrylamide and a partially hydrolyzed polyacrylamide.

In the method, the predetermined quantity of the chaser solution can be of the co-solvent. The co-solvent can be ethylene glycol butyl ether. The co-solvent can be ethylene glycol butyl ether and the predetermined quantity within the chaser solution of the ethylene glycol butyl ether can be greater than about 0.25 wt %. The co-solvent can be ethylene glycol butyl ether and the predetermined quantity within the chaser solution of the ethylene glycol butyl ether can be between about 0.25 wt % and 1.5 wt %.

In the method, the at least one co-solvent or co-surfactant of the surfactant-polymer solution can be of the co-solvent, and the predetermined quantity of the chaser solution can be of the co-solvent. The co-solvent can be ethylene glycol butyl ether. The co-solvent can be ethylene glycol butyl ether and the predetermined quantity within the chaser solution of the ethylene glycol butyl ether can be greater than about 0.25 wt %. The co-solvent can be ethylene glycol butyl ether and the predetermined quantity within the chaser solution of the ethylene glycol butyl ether can be between about 0.25 wt % and 1.5 wt %.

In the method, the surfactant-polymer solution and the chaser solution also comprise softened synthetic brine. In the method, the surfactant-polymer solution and the chaser solution also comprise softened synthetic Minas brine.

In the method, the surfactant of the surfactant-polymer solution can be a composition having a primary surfactant and a secondary surfactant. The primary surfactant can have an alkylaromatic moiety with the general formula:

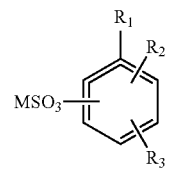

wherein R1 is hydrogen or an alkyl group containing from about 1 to 3 carbon atoms; R2 is hydrogen or an alkyl group having from about 1 to 3 carbon atoms; R3 is an alkyl group having from about 8 to about 60 carbon atoms and M is a mono-valent cation. The secondary surfactant can have the general formula:

wherein R4 is an aliphatic hydrocarbyl group having from about 12 to about 40 carbon atoms, and having from about 20 to 98 weight percent branching, and containing one or more olefin or alcohol moieties or mixtures thereof; and X is a mono-valent cation.

In the method, while forming the surfactant-polymer solution, the surfactant-polymer solution can remain clear and aqueous stable by the co-solvent or co-surfactant maintaining solubility and preventing the formation of precipitates and different phases of components of the surfactant-polymer solution. The solution can also remain clear within the wellbore during the step of injecting the surfactant-polymer solution through the wellbore into the reservoir. The solution can also remain clear upon entering the reservoir during the step of injecting the surfactant-polymer solution through the wellbore into the reservoir.

In the method, during the step of injecting the chaser solution through the wellbore into the reservoir, the chaser solution can maintain the clear and aqueous stable quality of the surfactant-polymer solution when the surfactant-polymer solution is diluted because the additional predetermined quantity of the co-solvent or co-surfactant maintains solubility and prevents the formation of precipitates and different phases of components of the surfactant-polymer solution.

In the method, the surfactant-polymer solution can be clear and aqueous stable at the temperature of the reservoir.

Another contemplated method for enhancing oil recovery includes the step of providing a subsurface reservoir containing hydrocarbons therewithin. An injection well having an injection wellbore in fluid communication with the subsurface reservoir is provided, as well as a production well spaced-apart from the injection well a predetermined distance and having a production wellbore in fluid communication with the subsurface reservoir. A surfactant-polymer solution is formed for injection into the reservoir by mixing a composition with at least one surfactant, at least one polymer, and at least one co-solvent such that the surfactant-polymer solution is clear and aqueous stable. The surfactant-polymer solution is injected through the injection wellbore into the reservoir. A chaser solution is formed that has an additional predetermined quantity of the co-solvent for injection into the reservoir. The chaser solution is injected through the injection wellbore into the reservoir to increase the flow of hydrocarbons through the reservoir toward the production wellbore while maintaining the clear and aqueous stability of the surfactant-polymer solution. The hydrocarbons are received within the production wellbore.

In the method, in the step of forming a chaser solution, the co-solvent can be ethylene glycol butyl ether and the predetermined quantity of the ethylene glycol butyl ether in the chaser solution can be between about 0.25 wt % and 1.5 wt %.

In the method, in the step of forming a chaser solution, the co-solvent can be ethylene glycol butyl ether and the predetermined quantity of the ethylene glycol butyl ether in the chaser solution can be greater than about 0.25 wt % of the chaser solution. The surfactant-polymer solution and the chaser solution can also have softened synthetic brine. The surfactant-polymer solution and the chaser solution can also have softened synthetic Minas brine.

In the method, the surfactant of the surfactant-polymer solution can be a composition having a primary surfactant and a secondary surfactant. The primary surfactant can have an alkylaromatic moiety with the general formula:

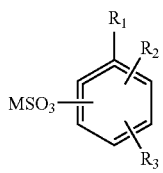

wherein R1 is hydrogen or an alkyl group containing from about 1 to 3 carbon atoms; R2 is hydrogen or an alkyl group having from about 1 to 3 carbon atoms: R3 is an alkyl group having from about 8 to about 60 carbon atoms and M is a mono-valent cation. The secondary surfactant can have the general formula:

$R_4$—$SO_3X$ wherein R4 is an aliphatic hydrocarbyl group having from about 12 to about 40 carbon atoms, and having from about 20 to 98 weight percent branching, and containing one or more olefin or alcohol moieties or mixtures thereof; and X is a mono-valent cation.

In the method, the co-solvent can be ethylene glycol butyl ether, and in the step of forming a surfactant-polymer solution the surfactant-polymer solution can remain clear and aqueous stable by the ethylene glycol butyl ether maintaining solubility and preventing the formation of precipitates and different phases of components of the surfactant-polymer solution.

In the method, the co-solvent of the surfactant-polymer solution can be ethylene glycol butyl ether, and in the step of injecting the surfactant-polymer solution through the injection wellbore into the reservoir the solution can remain clear within the wellbore. The solution can also remain clear upon entering the reservoir. The co-solvent of the chaser solution can also be ethylene glycol butyl ether. In the step of injecting the chaser solution through the injection wellbore into the reservoir, the chaser solution can maintain the surfactant-polymer solution being clear and aqueous stable when the surfactant-polymer solution is diluted, because the additional predetermined quantity of ethylene glycol butyl ether maintains solubility and prevents the formation of precipitates and different phases of components of the surfactant-polymer solution.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Definitions

As used herein, the following terms have the following meanings unless expressly stated to the contrary:

The term "primary surfactant" as used herein refers to the anionic aromatic surfactant that is present in the formulation.

The term "co-surfactant" as used herein refers to the anionic non-aromatic surfactant that is present in the formulation.

The terms "active" or "actives" as used herein refers to the concentration of the sodium salts of each surfactant species (i.e., primary surfactant or co-surfactant).

The term "alkylate" as used herein refers to the alkylaromatic compound used to prepare the alkylaromatic sulfonates of the present invention. The alkylaromatic compound was prepared using an aromatic compound and linear alpha olefin or isomerized olefin.

The term "isomerized alpha olefin (IAO)" as used herein refers to an alpha olefin that has been subjected to isomerization conditions which results in an alteration of the distribution of the olefin species present and/or the introduction of branching along the alkyl chain. The isomerized olefin product may be obtained by isomerizing a linear alpha olefin containing from about 12 to about 40 carbon atoms, and more preferably from about 20 to about 28 carbon atoms.

The term "alkali metal" as used herein refers to Group IA metals of the Periodic Table.

The term "co-solvent" as used herein refers to alcohols, ethers and/or a range of nonionic materials. Generally these nonionic materials have a somewhat higher tolerance to polyvalent ions, are water-soluble and may also provide a reduction in viscosity of the surfactant formulation.

The term "passivator" as used herein refers to alkali metal carbonate, bicarbonate or hydroxide salts.

The terms "enhanced oil recovery" or "EOR" as used herein refer to processes for enhancing the recovery of hydrocarbons from subterranean reservoirs.

The terms "Gas Chromatography" or "GC" as used herein refer to Gas Liquid Phase Chromatography.

The term oil solubilization parameter "SPo" refers to the volume of oil dissolved per unit volume of surfactant. Typically, oil solubilization parameter is measure via phase behavior experiments.

The terms "interfacial tension" or "IFT" as used herein refer to the surface tension between test oil and water of different salinities containing a surfactant formulation at different concentrations. Typically, interfacial tensions are measured using a spinning drop tensiometer or calculated from phase behavior experiments.

The term "Middle Phase" refers to the micro-emulsion formed by combining test oil and the reservoir brine containing the surfactant formulation during phase behavior testing.

The term "2-alkyl attachment" refers to attachment of the alkyl group on the aromatic ring wherein the longest alkyl chain is attached to the aromatic ring at the 2-position on the alkyl chain.

Unless otherwise specified, all percentages are in weight percent and the pressure is in atmospheres.

Figure 1:
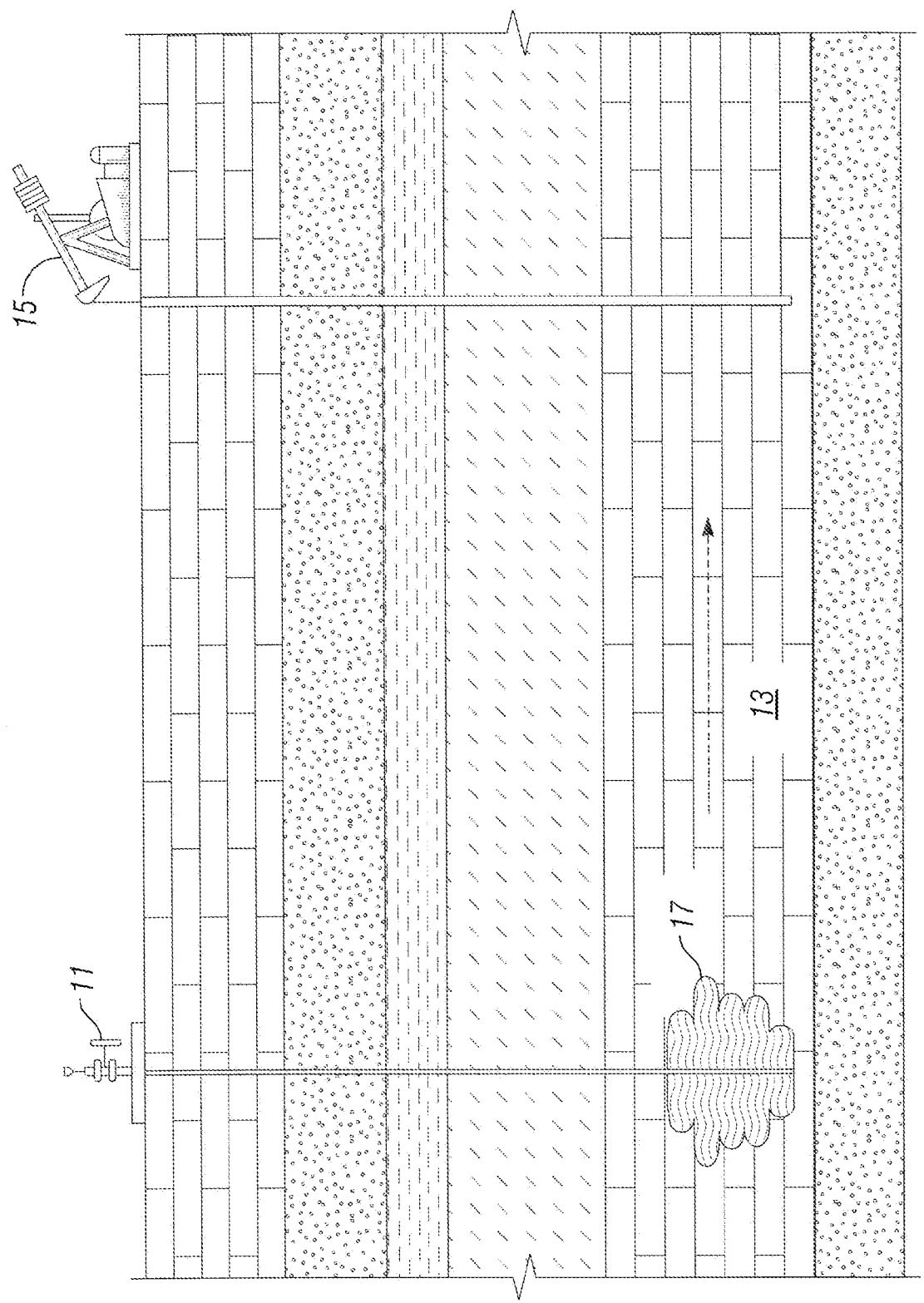
FIG. 1 is a schematic sectional view of a reservoir that is in fluid communication with an injection well and an production well during enhanced oil recovery operations after injection of a surfactant-polymer slug, in accordance with the present invention.

Referring to FIG. 1, an injection well 11 is illustrated extending to a portion of a subsurface reservoir 13 which contains hydrocarbons for production, such that injection well 11 is in fluid communication with subsurface reservoir 13 and the hydrocarbons. A production well 15 is positioned a predetermined distance away from injection well 11 and is also in fluid communication with reservoir 13 in order to receive the hydrocarbons therefrom. As will be readily appreciated by those skilled in the art, there can be additional production wells 15 spaced apart from injection well 11 at predetermined locations to optimally receive the hydrocarbons being pushed through reservoir 13 due to injections from injection well 11.

In an embodiment of the invention, a slug of water is first injected through injection well 11 into reservoir 13. A surfactant-polymer solution or slug 17 is then injected through injection well 11 into reservoir 13. Surfactant-polymer slug 17 preferably disperses through reservoir 13, with at least a portion thereof proceeding toward production well 15. In an embodiment of the invention, surfactant-polymer slug comprises a mixture of a surfactant and a polymer. In the preferred embodiment, the mixture for is surfactant-polymer slug 17 is a clear, aqueous stable solution such that surfactant-polymer slug 17. Surfactant-polymer slug 17 is preferably a true solution that free of suspended particles, rather than being a mixture that separates into multiple phases over time. Surfactant-polymer slug 17 can be characterized as being free of large micelles that interfere with the passage of light which make would make the solution hazy or opaque.

Figure 2C:
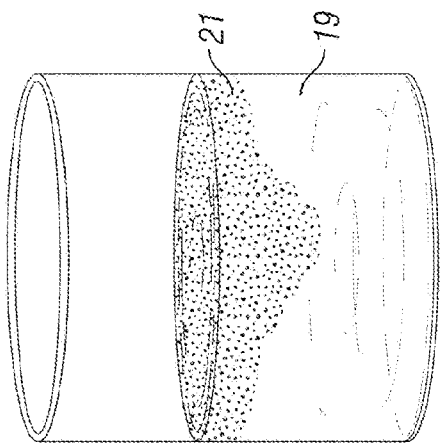
FIG. 2C is a side view of the prior art surfactant-polymer solution of FIG. 2B after a period of twenty-four hours.
Figure 2B:
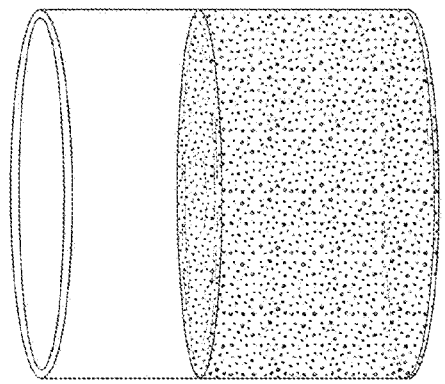
FIG. 2B is a side view of a prior art surfactant-polymer solution for use in the enhanced oil recovery operations.
Figure 2A:
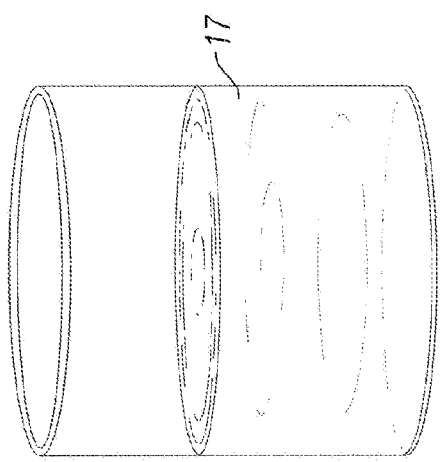
FIG. 2A is side view of a surfactant-polymer solution for use in the enhanced oil recovery operations of FIG. 1, in accordance with the present invention.

Referring to FIGS. 2A and 2B, a comparison is illustrated between surfactant-polymer solution or slug 17 (FIG. 2A) and a surfactant solution (FIG. 2B) having micelles with a large micellar size. Both were heated to 85 degrees Celsius. As is readily apparent to skilled in the art, the micelles associated with surfactant-polymer slug 17 solution are small enough such that they do not interfere with the passage of light, especially when heated to the temperature of reservoir 13, and thus appear transparent or clear. In a preferred embodiment of the invention, slug 17 is a pure solution without particles floating therein, or having large micelles associated therewith, such that slug 17 does not interfere with the passage of light at room temperature.

FIG. 2C, is an example of the separation of the "hazy" surfactant solution from FIG. 2B into multiple phases 19,21 after twenty-four (24) hours. Surfactant-polymer slug 17 does not have such separation, therefore surfactant-polymer slug 17 is also stable because it does not separate into multiple phases over time.

Referring back to FIG. 1, surfactant-polymer slug 17 is clear and aqueous stable, which means that surfactant-polymer slug 17 does not separate prior to or while propagating the porous medium of reservoir 13. By retaining the single-phase quality, surfactant-polymer slug 17 can more efficiently at as a detergent to reduce the surface tension of the oil/hydrocarbons and wash the hydrocarbons out of the pore spaces within reservoir 13. By being more efficient, surfactant-polymer slug 17 can also act upon hydrocarbons more effectively that are farther away from injection well 11.

The formulation of slug 17 preferably comprises a primary surfactant, a co-surfactant (or secondary surfactant), a co-solvent, a polymer and a passivator.

The Primary Surfactant

The primary surfactant of the present invention has the general formula:

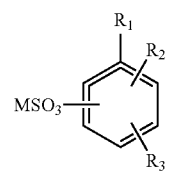

wherein R1 is hydrogen or an alkyl group containing from about 1 to 3 carbon atoms; R2 is hydrogen or an alkyl group having from about 1 to 3 carbon atoms; R3 is an alkyl group having from about 8 to about 60 carbon atoms, and M is a mono-valent cation. In one embodiment, M is an alkali metal, ammonium, or substituted ammonium.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

In one embodiment, R1 and R2 are methyl and the alkylaromatic moiety is alkylxylene. More preferably, the alkylxylene moiety is alkyl-ortho-xylene.

In another embodiment the alkylaromatic moiety is alkyl-meta-xylene.

The primary surfactant employed in the present invention is an alkylaromatic sulfonate salt obtained by the alkylation of an aromatic compound. Preferably, the aromatic compound is benzene, toluene, xylene, mixtures thereof or the like. More preferred, aromatic compound is toluene, xylene, or mixtures thereof. If xylene is employed, the xylene compound may comprise ortho-, meta-, or para-xylene, or mixtures thereof.

Typically, the aromatic compound is alkylated with a mixture of normal alpha olefins (NAO's) containing from C8-C60 carbon atoms, preferably C10-C50 carbon atoms, and most preferred from C12-C40 carbon atoms to yield an aromatic alkylate. The alkylate is sulfonated to form an alkylaromatic sulfonic acid which is then neutralized with caustic thereby producing a sodium alkylaromatic sulfonate compound. The most preferred alkylate is made by the alkylation of ortho-xylene which produces an alkylate containing several isomers, but in which at least 90 wt. % of the alkylate is the 1, 3, 4-ring attachment structure, having 40 to 60 wt % 2-alkyl attachment to the aromatic ring (i.e., wherein the longest alkyl chain is attached to the aromatic ring at the 2-position on the alkyl chain), preferably 45-55 wt % 2-alkyl attachment and more preferred about 50 wt % 2-alkyl attachment to the aromatic ring. Preferably, the alkylate will contain from 1 to 20 wt % dialkylate species and more preferably less than 10 wt % dialkylate species. Preferably, at least about 95 wt % and most preferred 98 wt % of the alkylate contains the 1, 3, 4-ring attachment structure. Upon sulfonation of the alkylate, a mixture of alkylaromatic sulfonic acid isomers are formed and the preferred isomer is the 2-alkyl-4,5-dimethyl benzene sulfonic acid isomer where the amount of this sulfonic acid isomer is present, preferably, in an amount of from about 1 to about 90 wt %, more preferably in an amount of from about 10 to about 80 wt % and most preferably in amount of at least about 70 wt %.

Aromatic Compound

At least one aromatic compound or a mixture of aromatic compounds may be used for the alkylation reaction in the present invention. Preferably the at least one aromatic compound or the aromatic compound mixture comprises at least one of monocyclic aromatics, such as benzene, toluene, xylene, cumene or mixtures thereof. More preferably, the at least one aromatic compound or aromatic compound mixture is xylene, including all isomers (i.e., meta ortho- and para-), and mixtures thereof. Most preferably, the at least one aromatic compound is ortho-xylene.

Sources of Aromatic Compound

The at least one aromatic compound or the mixture of aromatic compounds employed in the present invention is commercially available or may be prepared by methods that are well known in the art.

Olefins

The olefins employed to make the primary surfactant of the present invention may be derived from a variety of sources. Such sources include the normal alpha olefins, linear alpha olefins, isomerized linear alpha olefins, dimerized and oligomerized olefins, and olefins derived from olefin metathesis. Another source from which the olefins may be derived is through cracking of petroleum or Fischer-Tropsch wax. The Fischer-Tropsch wax may be hydrotreated prior to cracking.

Other commercial sources include olefins derived from paraffin dehydrogenation and oligomerization of ethylene and other olefins, methanol-to-olefin processes (methanol cracker) and the like.

In one embodiment, the aromatic compound may be alkylated with a mixture of normal alpha olefins (NAO's) containing from C8-C60 carbon atoms, preferably from C10-C50 carbon atoms and more preferred from C12-C40 carbon atoms to yield the primary surfactant alkylate.

Sources of Olefins

The normal alpha olefins employed to make the primary surfactant in the present invention are commercially available or may be prepared by methods that are well known in the art.

The olefins employed in this invention may be linear, isomerized linear, branched or partially branched. The olefin may be a single carbon number olefin, or it may be a mixture of linear olefins, a mixture of isomerized linear olefins, a mixture of branched olefins, a mixture of partially branched olefins, or a mixture of any of the foregoing.

The olefins may selected from olefins with carbon numbers ranging from about 8 carbon atoms to about 60 carbon atoms. Preferably, the olefins are selected from olefins with carbon numbers ranging from about 10 to about 50 carbon atoms, more preferred from about 12 to about 40 carbon atoms.

In another embodiment, the olefin or the mixture of olefins is selected from linear alpha olefins or isomerized olefins containing from about 8 to about 60 carbon atoms. More preferably, the mixture of olefins is selected from linear alpha olefins or isomerized olefins containing from about 10 to about 50 carbon atoms. Most preferably, the mixture of olefins is selected from linear alpha olefins or isomerized olefins containing from about 12 to about 40 carbon atoms.

The mixture of branched olefins is preferably selected from polyolefins which may be derived from C3 or higher monoolefins (i.e., propylene oligomers, butylenes oligomers, or co-oligomers etc.). Preferably, the mixture of branched olefins is either propylene oligomers or butylenes oligomers or mixtures thereof.

Preferably, the linear olefins that may be used for the alkylation reaction may be one or a mixture of normal alpha olefins selected from olefins having from about 8 to about 60 carbon atoms per molecule. More preferably, the normal alpha olefin is selected from olefins having from about 10 to about 50 carbon atoms per molecule. Most preferably, the normal alpha olefin is selected from olefins having from about 12 to about 40 carbon atoms per molecule.

In one embodiment of the present invention, the normal alpha olefins are isomerized using a solid or a liquid acid catalyst. A solid catalyst preferably has at least one metal oxide and an average pore size of less than 5.5 angstroms. More preferably, the solid catalyst is a molecular sieve with a one-dimensional pore system, such as SM-3, MAPO-11, SAPO-11, SSZ-32, ZSM-23, MAPO-39, SAPO-39, ZSM-22 or SSZ-20. Other possible acidic solid catalysts useful for isomerization include ZSM-35, SUZ-4, NU-23, NU-87 and natural or synthetic ferrierites. These molecular sieves are well known in the art and are discussed in Rosemarie Szostak's Handbook of Molecular Sieves (New York, Van Nostrand Reinhold, 1992) which is herein incorporated by reference for all purposes. A liquid type of isomerization catalyst that can be used is iron pentacarbonyl (Fe(CO)5).

The process for isomerization of normal alpha olefins may be carried out in batch or continuous mode. The process temperatures may range from about 50° C. to about 250° C. In the batch mode, a typical method used is a stirred autoclave or glass flask, which may be heated to the desired reaction temperature. A continuous process is most efficiently carried out in a fixed bed process. Space rates in a fixed bed process can range from 0.1 to 10 or more weight hourly space velocity.

In a fixed bed process, the isomerization catalyst is charged to the reactor and activated or dried at a temperature of at least 125° C. under vacuum or flowing inert, dry gas. After activation, the temperature of the isomerization catalyst is adjusted to the desired reaction temperature and a flow of the olefin is introduced into the reactor. The reactor effluent containing the partially-branched, isomerized olefins is collected. The resulting partially-branched, isomerized olefins contain a different olefin distribution (i.e., alpha olefin, beta olefin; internal olefin, tri-substituted olefin, and vinylidene olefin) and branching content than that of the unisomerized olefin and conditions are selected in order to obtain the desired olefin distribution and the degree of branching.

Acid Catalyst

Typically, the alkylated aromatic compound may be prepared using a Bronsted acid catalyst, a Lewis acid catalyst, or solid acidic catalysts.

The Bronsted acid catalyst may be selected from a group comprising hydrochloric acid, hydrofluoric acid, hydrobromic acid, sulfuric acid, perchloric acid, trifluoromethane sulfonic acid, fluorosulfonic acid, and nitric acid and the like. Preferably, the Bronsted acid catalyst is hydrofluoric acid.

The Lewis acid catalyst may be selected from the group of Lewis acids comprising aluminum trichloride, aluminum tribromide, aluminum triiodide, boron trifluoride, boron tribromide, boron triiodide and the like. Preferably, the Lewis acid catalyst is aluminum trichloride.

The solid acidic catalysts may be selected from a group comprising zeolites, acid clays, and/or silica-alumina. An eligible solid catalyst is a cation exchange resin in its acid form, for example crosslinked sulfonic acid catalyst. The catalyst may be a molecular sieve. Eligible molecular sieves are silica-aluminophosphate molecular sieves or metal silica-aluminophosphate molecular sieves, in which the metal may be, for example, iron, cobalt or nickel. Other suitable examples of solid acidic catalysts are disclosed in U.S. Pat. No. 7,183,452, which is herein incorporated by reference.

The Bronsted acid catalyst may be regenerated after it becomes deactivated (i.e., the catalyst has lost all or some portion of its catalytic activity). Methods that are well known in the art may be used to regenerate the acid catalyst, for example, hydrofluoric acid.

Process for Preparing the Alkylated Aromatic Compound

The alkylation technologies used to produce the primary surfactant alkylate will include Bronsted and/or Lewis acids as well as solid acid catalysts utilized in a batch, semi-batch or continuous process operating at between from about 0 to about 300 degrees Celsius.

The acid catalyst may be recycled when used in a continuous process. The acid catalyst may be recycled or regenerated when used in a batch process or a continuous process.

In one embodiment of the present invention, the alkylation process is carried out by reacting a first amount of at least one aromatic compound or a mixture of aromatic compounds with a first amount of a mixture of olefin compounds in the presence of a Bronsted acid catalyst, such as hydrofluoric acid, in a first reactor in which agitation is maintained, thereby producing a first reaction mixture. The resulting first reaction mixture is held in a first alkylation zone under alkylation conditions for a time sufficient to convert the olefin to aromatic alkylate (i.e., a first reaction product). After a desired time, the first reaction product is removed from the alkylation zone and fed to a second reactor wherein the first reaction product is reacted with an additional amount of at least one aromatic compound or a mixture of aromatic compounds and an additional amount of acid catalyst and, optionally, with an additional amount of a mixture of olefin compounds wherein agitation is maintained. A second reaction mixture results and is held in a second alkylation zone under alkylation conditions for a time sufficient to convert the olefin to aromatic alkylate (i.e., a second reaction product). The second reaction product is fed to a liquid-liquid separator to allow hydrocarbon (i.e., organic) products to separate from the acid catalyst. The acid catalyst may be recycled to the reactor(s) in a closed loop cycle. The hydrocarbon product is further treated to remove excess un-reacted aromatic compounds and, optionally, olefinic compounds from the desired alkylate product. The excess aromatic compounds may also be recycled to the reactor(s).

In another embodiment of the present invention, the reaction takes place in more than two reactors which are located in series. Instead of feeding the second reaction product to a liquid-liquid separator, the second reaction product is fed to a third reactor wherein the second reaction product is reacted with an additional amount of at least one aromatic compound or a mixture of aromatic compounds and an additional amount of acid catalyst and, optionally, with an additional amount of a mixture of olefin compounds wherein agitation is maintained. A third reaction mixture results and is held in a third alkylation zone under alkylation conditions for a time sufficient to convert the olefin to aromatic alkylate (i.e., a third reaction product). The reactions take place in as many reactors as necessary to obtain the desired alkylated aromatic reaction product.

The total charge mole ratio of Bronsted acid catalyst to the olefin compounds is about 1.0 to 1 for the combined reactors. Preferably, the charge mole ratio of Bronsted acid catalyst to the olefin compounds is no more than about 0.7 to 1 in the first reactor and no less than about 0.3 to 1 in the second reactor.

The total charge mole ratio of the aromatic compound to the olefin compounds is about 7.5 to 1 for the combined reactors. Preferably, the charge mole ratio of the aromatic compound to the olefin compounds is no less than about 1.4 to 1 in the first reactor and is no more than about 6.1 to 1 in the second reactor.

Many types of reactor configurations may be used for the reactor zone. These include, but are not limited to, batch and continuous stirred tank reactors, reactor riser configurations, ebulating bed reactors, and other reactor configurations that are well known in the art. Many such reactors are known to those skilled in the art and are suitable for the alkylation reaction. Agitation is critical for the alkylation reaction and can be provided by rotating impellers, with or without baffles, static mixers, kinetic mixing in risers, or any other agitation devices that are well known in the art.

The alkylation process may be carried out at temperatures from about 0° C. to about 100° C. The process is carried out under sufficient pressure that a substantial portion of the feed components remain in the liquid phase. Typically, a pressure of 0 to 150 psig is satisfactory to maintain feed and products in the liquid phase.

The residence time in the reactor is a time that is sufficient to convert a substantial portion of the olefin to alkylate product. The time required is from about 30 seconds to about 30 minutes. A more precise residence time may be determined by those skilled in the art using batch stirred tank reactors to measure the kinetics of the alkylation process.

The at least one aromatic compound or mixture of aromatic compounds and the olefin compounds may be injected separately into the reaction zone or may be mixed prior to injection. Both single and multiple reaction zones may be used with the injection of the aromatic compounds and the olefin compounds into one, several, or all reaction zones. The reaction zones need not be maintained at the same process conditions.

The hydrocarbon feed for the alkylation process may comprise a mixture of aromatic compounds and olefin compounds in which the molar ratio of aromatic compounds to olefins is from about 0.5:1 to about 50:1 or more. In the case where the molar ratio of aromatic compounds to olefin is >1.0 to 1, there is an excess amount of aromatic compounds present. Preferably an excess of aromatic compounds is used to increase reaction rate and improve product selectivity. When excess aromatic compounds are used, the excess un-reacted aromatic in the reactor effluent can be separated, e.g. by distillation, and recycled to the reactor.

Preparation of Alkylaryl Sulfonate

The alkylaromatic product prepared by the process described herein is further reacted to form an alkylaromatic sulfonic acid and then the corresponding sulfonate.

Sulfonation

Sulfonation of the alkylaromatic compound may be performed by any method known to one of ordinary skill in the art. The sulfonation reaction is typically carried out in a continuous falling film tubular reactor maintained at about 45° C. to about 75° C. The alkylaromatic compound is placed in the reactor along with sulfur trioxide diluted with air thereby producing an alkylaryl sulfonic acid. Other sulfonation reagents, such as sulfuric acid, chlorosulfonic acid or sulfamic acid may also be employed. Preferably, the alkylaromatic compound is sulfonated with sulfur trioxide diluted with air. The charge mole ratio of sulfur trioxide to alkylate is maintained at about 0.8 to 1.1:1.

Neutralization of Alkylaromatic Sulfonic Acid

Neutralization of the alkylaryl sulfonic acid may be carried out in a continuous or batch process by any method known to a person skilled in the art to produce alkylaryl sulfonates. Typically, an alkylaryl sulfonic acid is neutralized with a source of alkali or alkaline earth metal or ammonia, thereby producing an alkylaryl sulfonate. Preferably, the source is an alkali metal base; more preferably, the source is an alkali metal hydroxide, such as but not limited to, sodium hydroxide or potassium hydroxide.

An example of a primary surfactant for slug 17 is "CS2000A," which is produced by and available from Chevron Oronite Company LLC.

The Secondary Surfactant

The enhanced oil recovery formulation of the present invention also contains a secondary surfactant. The secondary surfactant has the general formula:

wherein R4 is an aliphatic hydrocarbyl group having from about 12 to about 40 carbon atoms, and having from about 20 to 98 weight percent branching, and containing one or more olefin or alcohol moieties or mixtures thereof; and X is a mono-valent cation. In one embodiment, X is an alkali metal, ammonium or substituted ammonium.

Examples of substituted ammonium include ammonium independently substituted with from about 1 to about 4 aliphatic or aromatic hydrocarbyl groups having from about 1 to about 15 carbon atoms, such as alkyl, aryl, alkaryl and aralkyl, and optionally having one or more heteroatoms, such as nitrogen, oxygen or sulfur, which may be present in aliphatic or aromatic heterocyclic rings. Examples of suitable heterocyclic ring substituents include pyrrole, pyrrolidine, pyridine, pyrimidine, pyrazole, imidazole and quinoline. The heterocyclic ring substituent may be substituted on the ammonium moiety through a carbon atom in the heterocyclic ring, such as in a C-pyridyl-substituted ammonium, or, alternatively, the quaternary ammonium nitrogen itself may be a nitrogen atom in the heterocyclic ring, such as in a pyridinium ion.

The secondary surfactant employed in the present invention is an isomerized olefin sulfonate (IOS) made by the sulfonation of an isomerized alpha olefin (IAO) in which the IAO is made by the isomerization of C12-C40 normal alpha olefins (NAO), preferably C20-C28 normal alpha olefins, most preferred C20-C24 normal alpha olefins.

In one embodiment, R4 is derived from a partially isomerized alpha olefin containing a residual alpha olefin content.

The IAO comprises from about 12 to about 40 carbon atoms, more preferred from about 20 to about 28 carbon atoms and most preferred from about 20 to about 24 carbon atoms.

The IAO is composed of between from about 20 to about 98 wt % branching, preferably from about 45 to about 80 wt % branching and most preferred from about 60 to about 70 wt % branching and between from about 0.1 to about 30 wt % residual alpha olefin, preferably between from about 0.2 to about 20 wt % residual alpha olefin and most preferably between from about 0.5 to about 10 wt % residual alpha olefin species.

In one embodiment, the IAO is composed of at least about 23% branching, at least about 9% residual alpha olefin, and having from about 20 to about 24 carbon atoms.

In another embodiment, the IAO is composed of at least about 65% branching, at least about 0.2-0.5 residual alpha olefin and having from about 20 to about 24 carbon atoms.

In one embodiment, when the percent branching in the partially isomerized alpha olefin is less than or equal to 25 weight percent, then the residual alpha olefin content in such partially isomerized alpha olefin is greater than or equal to 8 weight percent.

Typically, the normal alpha olefins are isomerized as described hereinabove.

Sulfonation

Sulfonation of the IAO may be performed by any method known to one of ordinary skill in the art to produce an IAO sulfonic acid intermediate. The sulfonation reaction is typically carried out in a continuous falling film tubular reactor maintained at about 30° C. to about 75° C. The charge mole ratio of sulfur trioxide to olefin is maintained at about 0.3 to 1.1:1.

Other sulfonation reagents, such as sulfuric acid, chlorosulfonic acid or sulfamic acid may also be employed. Preferably, the isomerized alpha olefin is sulfonated with sulfur trioxide diluted with air.

The product from the sulfonation process may then be thermally digested by heating.

Neutralization of the Isomerized Alpha Olefin Sulfonic Acid

Neutralization of the IAO sulfonic acid may be carried out in a continuous or batch process by any method known to a person skilled In the art to produce the IOS. Typically, an IAO sulfonic acid is neutralized with a source of alkali metal, ammonium, or substituted ammonium. Preferably, the source is an alkali metal base; more preferably, the source is an alkali metal hydroxide, such as but not limited to, sodium hydroxide or potassium hydroxide.

As noted above, sulfonation of the IAO may be followed by thermal digestion and the resulting product is then neutralized with caustic, and optionally followed by hydrolysis with caustic. The resulting sodium isomerized olefin sulfonate (IOS) is composed of between from about 1 to about 70 wt % alcohol sodium sulfonate. In one embodiment, IOS is composed of between from about 5 to about 35 wt % alcohol sodium sulfonate species with the remainder of the sodium sulfonate species being the sodium olefin sulfonate species. In another embodiment the IOS is composed of between from about 35 to about 60 wt % alcohol sodium sulfonate species with the remainder of the sodium sulfonate species being the sodium olefin sulfonate species.

In one embodiment, the neutralized isomerized alpha olefin sulfonate is further hydrolyzed with caustic.

With regard to M in the primary surfactant and X in the co-surfactant, M and X are independently mono-valent cations, and preferably are independently selected from alkali metal, ammonium and substituted ammonium.

An example of a secondary surfactant for slug 17 is "CS1500," which is produced by and available from Chevron Oronite Company LLC.

The Co-Solvent

Suitable co-solvents employed in the present invention are alcohols, such as lower carbon chain alcohols like isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycols ethers or any other common organic co-solvent or combinations of any two or more co-solvents. For example, in an embodiment of the invention an ether, ethylene glycol butyl ether (EGBE), is used and typically is about 3 wt % of slug 17.

The Passivator

Typically, the passivator employed in the present invention is an alkali metal salt. Preferably, the alkali metal salt is a base, such as an alkali metal hydroxide, carbonate or bicarbonate, including, but not limited to, sodium carbonate, sodium bicarbonate, sodium hydroxide, potassium hydroxide, lithium hydroxide and the like. Sodium chloride can also be used.

The Polymer

Polymers, such as those commonly employed for enhanced oil recovery, may be included to control the mobility of the injection solution. Such polymers include, but are not limited to, xanthan gum, partially hydrolyzed polyacrylamides (HPAM) and copolymers of 2-acrylamido-2-methylpropane sulfonic acid and/or sodium salt and polyacrylamide (PAM) commonly referred to as AMPS copolymer. Molecular weights (Mw) of the polymers range from about 10,000 daltons to about 20,000,000 daltons. Polymers are used in the range of about 500 to about 2500 ppm concentration, preferably from about 1000 to 2000 ppm in order to match or exceed the reservoir oil viscosity under the reservoir conditions of temperature and pressure. An example of a polymer is "Flopaam™ AN125," which is produced by and available from SNF.

Formulation of Slug 17

The enhanced oil recovery surfactant formulation used in the recovery of oil in reservoirs, by the use of surfactant flooding techniques, comprises a primary surfactant, a secondary surfactant, a co-solvent, a passivator and a polymer in an aqueous solution. Typically, the aqueous solution comprises from about 500 to about 10,000 ppm total dissolved solids.

In an embodiment of the invention, the formulation of slug 17 comprises from about 0.5 to about 4.0 weight percent actives of the primary surfactant, from about 0.1 to 3.0 weight percent actives of the secondary surfactant, from about 0.5 to about 6.0 weight percent of the co-solvent, from about 0.3 to about 1.0 weight percent of the passivator and from about 500 to 4000 ppm of the polymer, all of which are in an aqueous solution containing from about 500 to about 10,000 ppm total dissolved solids.

In a preferred embodiment of the invention, the formulation of slug 17 comprises from about 1.0 to about 3.0 wt % actives of the primary surfactant, from about 0.3 to about 2.0 wt % actives of the secondary surfactant, from about 1.0 to about 4.0 wt % of the co-solvent, from about 0.5 to about 0.85 wt % of the passivator and from about 1000 to about 3000 ppm of the polymer, all of which are in an aqueous solution containing from about 1000 to about 10,000 ppm total dissolved solids.

Most preferred, the formulation of slug 17 comprises about 1.5 wt % actives of the primary surfactant, about 0.5 wt % actives of the secondary surfactant, about 3 wt % of a co-solvent, about 0.85 wt % of a passivator and about between about 0.1 to about 0.2 wt % of the polymer, all of which are in an aqueous solution containing from about 1000 to about 10,000 ppm total dissolved solids.

The ratio of the primary surfactant to the secondary surfactant will typically be responsive to the amount of electrolytes associated with the reservoir and/or the water (mixing with produced water or fresh). For each reservoir operation, an optimal salinity can be determined, and the primary and secondary surfactants can be mixed in order to work most effectively at that salinity. Such mixtures for achieving optimal salinity are described and taught by "Identification and Evaluation of High-Performance EOR Surfactants," D. B. Levitt, A. C. Jackson, C. Heinson, L. N. Britton, T. Malik, V. Dwarakanath, and G. A. Pope, SPE/DOE Symposium on Improved Oil Recovery (SPE 100089), 22-26 Apr. 2006, Tulsa. Okla., USA, 2006.

Figure 3:
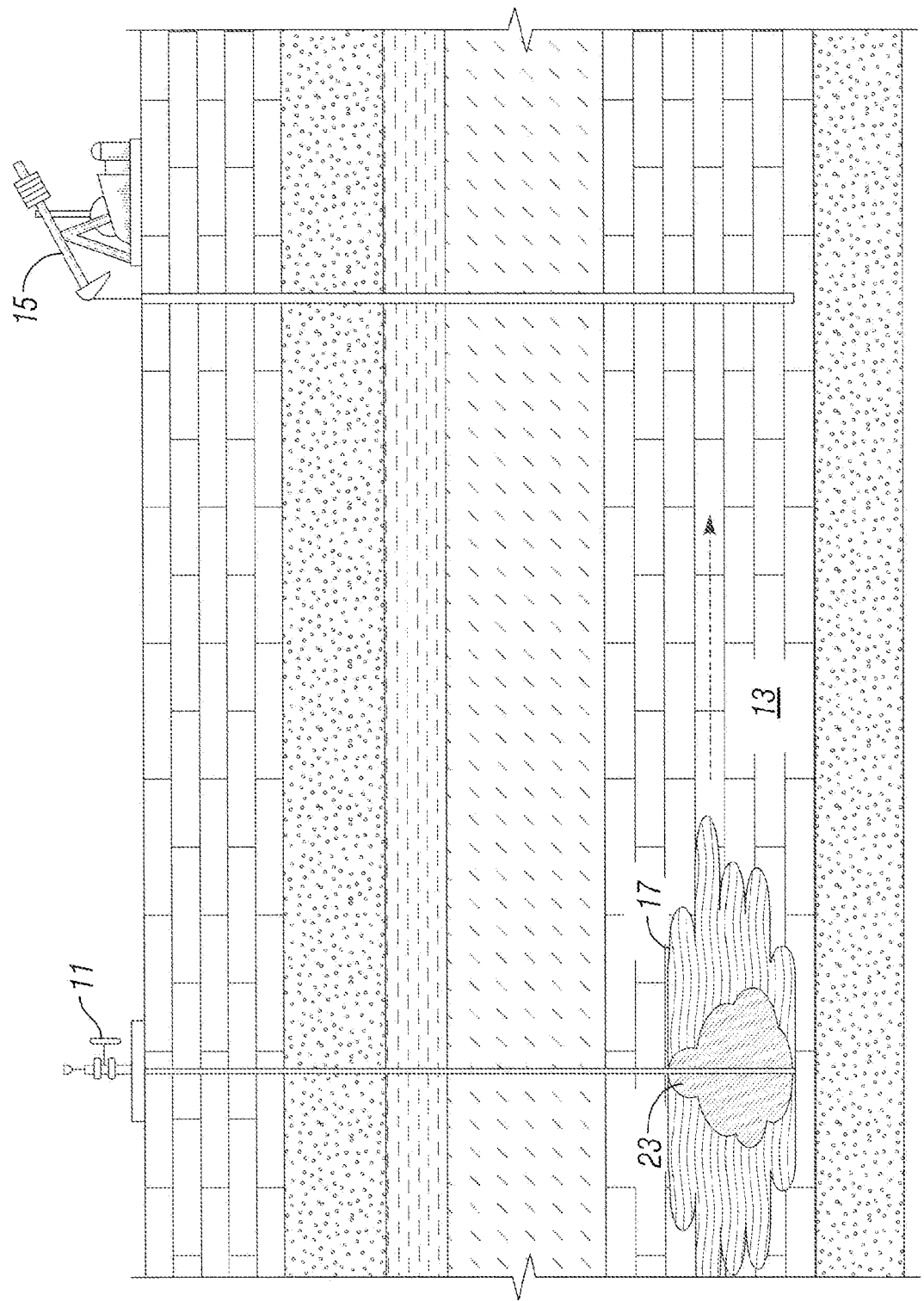
FIG. 3 is a schematic sectional view the reservoir, the injection well and the production well following injection of a chaser slug, in accordance with the present invention.

Referring to FIG. 3, a driver or chaser slug 23 is then injected through injection well 11 into reservoir 13. As noted previously, most chaser slugs contain water in order increase pressure to drive or push the hydrocarbons, which are typically in the form of a microemulsion at this point, toward production well 15. Such water can dilute surfactant-polymer slug 17, which can cause phase separation. Therefore, chaser solution or slug 23 is formulated to help surfactant-polymer slug 17 maintain its clear phase when diluted by the water in chaser slug 23. In an embodiment of the invention, chaser slug 23 is a composition comprising at least one co-solvent or co-surfactant. In a preferred embodiment of the invention, the chaser slug has a co-solvent that is either ethylene glycol butyl ether (EGBE) or di-ethylene glycol butyl ether (DGBE).

In a test of an embodiment of the invention, surfactant-polymer slug 17 comprises 2 wt % surfactants (e.g., 1.5 wt % CS2000A as the primary surfactant and 0.5 wt % CS1500 as the secondary surfactant), 3.0 wt % ethylene glycol butyl ether (EGBE) co-solvent, 0.1-0.2 wt % polymer, and 0.7 wt % sodium carbonate mixed in softened synthetic Minas brine (SSMB) and water. The SSMB is a softened synthetic brine that is a low salinity softened brine (no divalent ions) with a Total Dissolved Solids (TDS) content of about 2800 mg/l. The water can be produced water or fresh water. As shown in FIG. 5, chaser slugs 23 having compositions of between about 0.25 and 1.5 wt % EGBM, SSMB and water were tested and maintained the clear aqueous stable properties of surfactant-polymer slug 17 for a period of forty-eight (48) hours. The results for these tests are provided for in FIG. 4.

Figure 4:
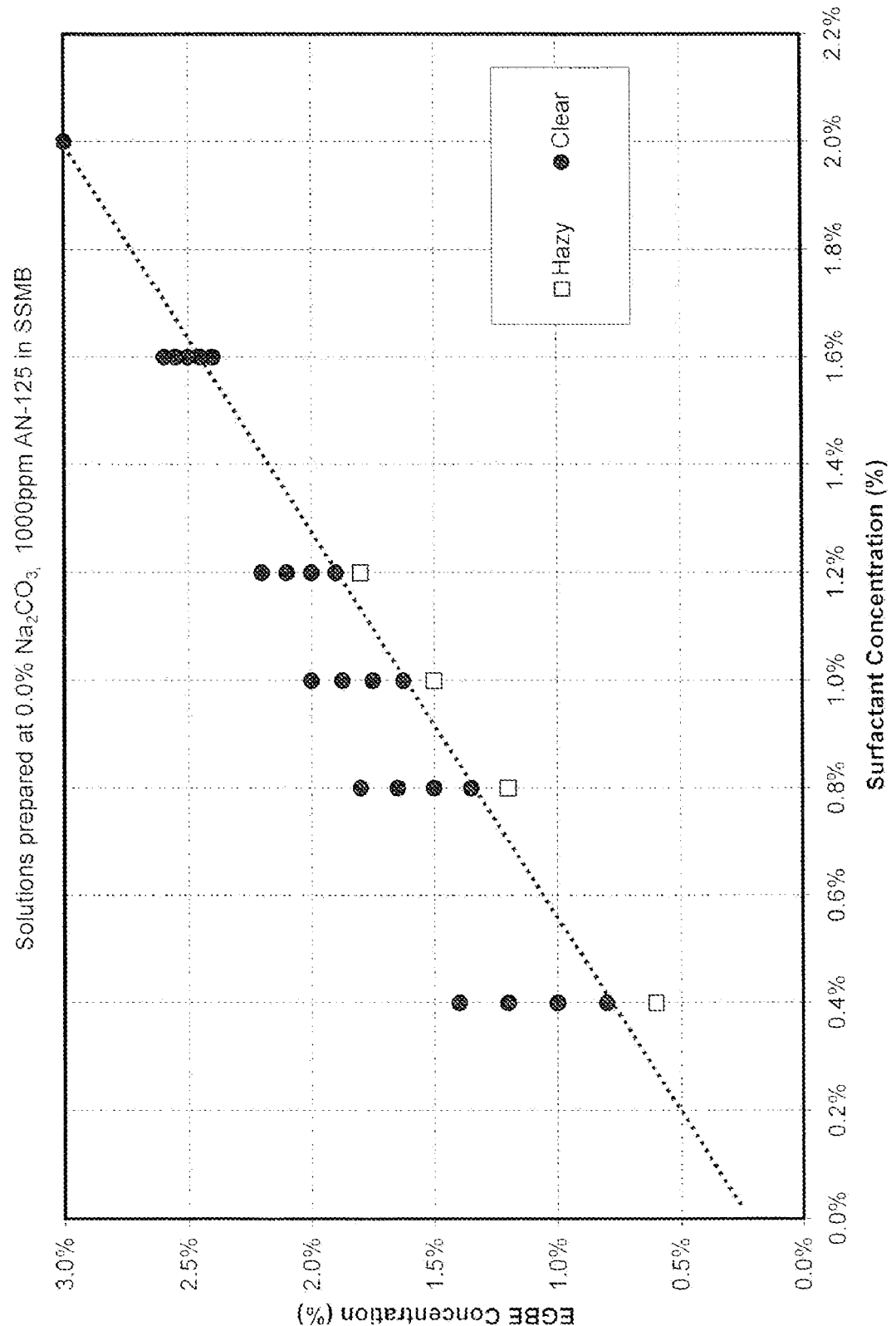
FIG. 4 is a table showing results of testing to determine the amount of polymer desired within the chaser slug of FIG. 3 to maintain clear and aqueous stable properties of the surfactant-polymer slug of FIG. 2A when the chaser slug is injected into the reservoir of FIG. 3.

As can be seen in FIG. 4, each data point above the dotted line remained clear and aqueous stable. Based upon the results of the tests, it is contemplated within the invention that chaser slugs having compositions of greater than or equal to about 0.25 wt % EGBE mixed with softened synthetic brine or SSMB and water are sufficient for maintaining the clear and aqueous stable properties of surfactant-polymer slug 17.

It is advantageous to maintain clear aqueous solutions that also have low viscosity in both surfactant-polymer slug 17, as well as the mixing zone within reservoir 13 located between surfactant-polymer and chase slugs 17,23. This provides for more effective and more efficient propagation of surfactant-polymer slug 17 in order to mobilize the crude oil for enhanced oil recovery. When aqueous stability is obtained throughout expected dilution paths once chaser slug 23 has been injected into reservoir 13, there is virtually no tendency for phase separation, and therefore, minimal retention of the surfactant of surfactant-polymer slug 17 within reservoir.

In controlled experiments with stable aqueous solutions it has be shown that surfactant retention is less than 0.1 mg/g and residual oil recovery is greater than 90%. The retention number so achieved is extremely low. More specifically, when a clear and aqueous stable solution was used, there was a recovery of 94% of the oil with a pore volume multiplied by concentration (PVC) value of 0.2. However, when an aqueous unstable formulation was used, there was a recovery of 91% of the oil with a PVC value of 0.3 for the same surfactant. This means that the comparable experiments with the aqueous unstable solutions required about 50% more surfactant to recover the same fraction of oil. Therefore, the process efficiency is improved by about 50% when using a clear and aqueous stable solution, such as achieved with surfactant-polymer and chaser slugs 17,23.

As noted before, in the past there was not an appreciation that attention needed to be given to the aqueous stability of the surfactant-polymer slug, solution, or composition, which can lead to lower than anticipated oil recoveries. This was a problem that heretofore had not been identified. It is contemplated within the scope of this invention that maintaining the aqueous stability of the surfactant-polymer slug is important to enhanced oil recovery. It is contemplated that such attention can be given to surfactant slug 17, chaser slug 23, or a combination thereof. As discussed above, in the best mode of the invention, the polymer (e.g. EGBE) is added to both surfactant slug 17 and chaser slug 23 in order to maintain the clear aqueous stable quality of surfactant slug 17 while surfactant slug 17 is injected, as well as when surfactant slug 17 is diluted after chaser slug 23 is injected.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for enhancing oil recovery, comprising:
    (a) providing a subsurface reservoir containing hydrocarbons therewithin;
    (b) providing a wellbore in fluid communication with the subsurface reservoir;
    (c) forming a surfactant-polymer solution for injection into the reservoir by mixing a composition with at least one surfactant, at least one polymer, and at least one co-solvent or co-surfactant such that the surfactant-polymer solution is clear and aqueous stable;
    (d) injecting the surfactant-polymer solution through the wellbore into the reservoir;
    (e) forming a chaser solution having an additional predetermined quantity of the co-solvent or co-surfactant for injection into the reservoir; and
    (f) injecting the chaser solution through the injection wellbore into the reservoir to increase the production of hydrocarbons from the reservoir while maintaining the clear and aqueous stability of the surfactant-polymer solution.

2. The method of claim 1, wherein the wellbore in step (b) is an injection wellbore associated with an injection well, and the method further comprises:
    providing a production well spaced-apart from the injection well a predetermined distance and having a production wellbore in fluid communication with the subsurface reservoir, wherein the injection of the surfactant-polymer solution in step (d) and the chaser solution in step (f) increases the flow of the hydrocarbons to the production wellbore.

3. The method of claim 1, wherein the predetermined quantity of the chaser solution is of the co-solvent.

4. The method of claim 3, wherein the co-solvent is ethylene glycol butyl ether.

5. The method of claim 3, wherein co-solvent is ethylene glycol butyl ether and the predetermined quantity within the chaser solution of the ethylene glycol butyl ether is greater than about 0.25 wt %.

6. The method of claim 3, wherein co-solvent is ethylene glycol butyl ether and the predetermined quantity within the chaser solution of the ethylene glycol butyl ether is between about 0.25 wt % and 1.5 wt %.

7. The method of claim 1, wherein:
    the at least one co-solvent or co-surfactant of the surfactant-polymer solution is the co-solvent; and
    the predetermined quantity of the chaser solution is the co-solvent.

8. The method of claim 7, wherein the co-solvent is ethylene glycol butyl ether and the predetermined quantity within the chaser solution of the ethylene glycol butyl ether is greater than about 0.25 wt %.

9. The method of claim 7, wherein the co-solvent is ethylene glycol butyl ether and the predetermined quantity within the chaser solution of the ethylene glycol butyl ether is between about 0.25 wt % and 1.5 wt %.

10. The method of claim 1, wherein the surfactant-polymer solution and the chaser solution further comprises softened synthetic brine.

11. The method of claim 1, wherein the surfactant-polymer solution and the chaser solution further comprises softened synthetic Minas brine.

12. The method of claim 1, wherein the surfactant of the surfactant-polymer solution comprises:
    a primary surfactant comprising an alkylaromatic moiety having the general formula:

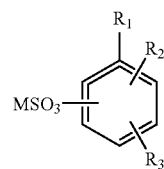

wherein R1 is hydrogen or an alkyl group containing from about 1 to 3 carbon atoms; R2 is hydrogen or an alkyl group having from about 1 to 3 carbon atoms; R3 is an alkyl group having from about 8 to about 60 carbon atoms and M is a mono-valent cation; and
a secondary surfactant having the general formula:

$$R_4\text{—}SO_3X$$

wherein R4 is an aliphatic hydrocarbyl group having from about 12 to about 40 carbon atoms, and having from about 20 to 98 weight percent branching, and containing one or more olefin or alcohol moieties or mixtures thereof; and X is a mono-valent cation.

13. The method of claim 1, wherein in step (c) the surfactant-polymer solution remains clear and aqueous stable by the co-solvent or co-surfactant maintaining solubility and preventing the formation of precipitates and different phases of components of the surfactant-polymer solution.

14. The method of claim 13, wherein in step (d), the solution remains clear within the wellbore.

15. The method of claim 14, wherein in step (d), the solution remains clear upon entering the reservoir.

16. The method of claim 1, wherein in step (f) the chaser solution maintains the surfactant-polymer solution being clear and aqueous stable when the surfactant-polymer solution is diluted because the additional predetermined quantity of the co-solvent or co-surfactant maintains solubility and prevents the formation of precipitates and different phases of components of the surfactant-polymer solution.

17. The method of claim 1, wherein the surfactant-polymer solution is clear and aqueous stable at the temperature of the reservoir.

18. The method of claim 1, wherein the at least one polymer is a synthetic polymer.

19. The method of claim 1, wherein the at least one polymer is a partially hydrolyzed polyacrylamide.

20. A method for enhancing oil recovery, comprising:
(a) providing a subsurface reservoir containing hydrocarbons therewithin;
(b) providing an injection well having an injection wellbore in fluid communication with the subsurface reservoir, and a production well spaced-apart from the injection well a predetermined distance and having a production wellbore in fluid communication with the subsurface reservoir;
(c) forming a surfactant-polymer solution for injection into the reservoir by mixing a composition with at least one surfactant, at least one polymer, and at least one co-solvent such that the surfactant-polymer solution is clear and aqueous stable;
(d) injecting the surfactant-polymer solution through the injection wellbore into the reservoir;
(e) forming a chaser solution having an additional predetermined quantity of the co-solvent for injection into the reservoir;
(f) injecting the chaser solution through the injection wellbore into the reservoir to increase the flow of hydrocarbons through the reservoir toward the production wellbore while maintaining the clear and aqueous stability of the surfactant-polymer solution; and
(g) receiving the hydrocarbons within the production wellbore.

21. The method of claim 20, wherein in step (e), the co-solvent is ethylene glycol butyl ether and the predetermined quantity in the chaser solution is between about 0.25 wt % and 1.5 wt %.

22. The method of claim 20, wherein in step (e), the co-solvent is ethylene glycol butyl ether and the predetermined quantity in the chaser solution is greater than about 0.25 wt %.

23. The method of claim 22, wherein the surfactant-polymer solution and the chaser solution further comprises softened synthetic brine.

24. The method of claim 20, wherein the surfactant of the surfactant-polymer solution comprises:
a primary surfactant comprising an alkylaromatic moiety having the general formula:

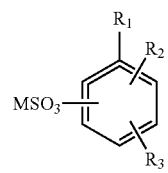

wherein R1 is hydrogen or an alkyl group containing from about 1 to 3 carbon atoms; R2 is hydrogen or an alkyl group having from about 1 to 3 carbon atoms; R3 is an alkyl group having from about 8 to about 60 carbon atoms and M is a mono-valent cation; and
a secondary surfactant having the general formula:

$$R_4\text{—}SO_3X$$

wherein R4 is an aliphatic hydrocarbyl group having from about 12 to about 40 carbon, atoms, and having from about 20 to 98 weight percent branching, and containing one or more olefin or alcohol moieties or mixtures thereof; and X is a mono-valent cation.

25. The method of claim 20, wherein:
the co-solvent is ethylene glycol butyl ether; and
in step (c) the surfactant-polymer solution remains clear and aqueous stable by the ethylene glycol butyl ether maintaining solubility and preventing the formation of precipitates and different phases of components of the surfactant-polymer solution.

26. The method of claim 25, wherein in step (d), the solution remains clear within the wellbore and upon entering the wellbore.

27. The method of claim 25, wherein in step (f) the chaser solution maintains the surfactant-polymer solution being clear and aqueous stable when the surfactant-polymer solution is diluted because the additional predetermined quantity of ethylene glycol butyl ether maintains solubility and prevents the formation of precipitates and different phases of components of the surfactant-polymer solution.

* * * * *